(12) United States Patent
Sazawa et al.

(10) Patent No.: US 11,073,055 B2
(45) Date of Patent: Jul. 27, 2021

(54) ELECTROSTATIC OIL MIST SEPARATOR FOR INTERNAL COMBUSTION ENGINE

(71) Applicant: TOYOTA BOSHOKU KABUSHIKI KAISHA, Aichi (JP)

(72) Inventors: Makoto Sazawa, Kariya (JP); Satoshi Kawabe, Ichinomiya (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 461 days.

(21) Appl. No.: 16/225,981

(22) Filed: Dec. 19, 2018

(65) Prior Publication Data
US 2019/0195098 A1    Jun. 27, 2019

(30) Foreign Application Priority Data

Dec. 26, 2017 (JP) .............................. JP2017-249480

(51) Int. Cl.
| | |
|---|---|
| *B03C 3/08* | (2006.01) |
| *B03C 3/155* | (2006.01) |
| *B03C 3/36* | (2006.01) |
| *B03C 3/47* | (2006.01) |
| *B01D 46/00* | (2006.01) |
| *B01D 46/50* | (2006.01) |

(Continued)

(52) U.S. Cl.
CPC ............ *F01M 13/04* (2013.01); *B01D 46/002* (2013.01); *B01D 46/0032* (2013.01); *B01D 46/50* (2013.01); *B01D 53/323* (2013.01); *B03C 3/08* (2013.01); *B03C 3/155* (2013.01); *B03C 3/366* (2013.01); *B03C 3/47* (2013.01); *B03C 2201/30* (2013.01); *F01M 2013/0438* (2013.01); *F01M 2013/0466* (2013.01)

(58) Field of Classification Search
CPC combination set(s) only.
See application file for complete search history.

(56) References Cited

U.S. PATENT DOCUMENTS 4,477,268 A * 10/1984 Kalt ..................... B03C 3/155
                                                          96/67
5,055,118 A * 10/1991 Nagoshi ................ B03C 3/08
                                                          96/88

(Continued)

FOREIGN PATENT DOCUMENTS

JP          2016-109039          6/2016

*Primary Examiner* — Christopher P Jones
*Assistant Examiner* — Sonji Turner
(74) *Attorney, Agent, or Firm* — Greenblum & Bernstein, P.L.C.

(57) ABSTRACT

An electrostatic oil mist separator for an internal combustion engine includes a positive plate and a negative plate facing each other, a filter arranged between the positive plate and the negative plate, a case having an inlet and an outlet and houses the positive plate, the negative plate, and the filter, and a voltage generator. The electrostatic oil mist separator is configured to cause blow-by gas to flow from the inlet to the outlet between the positive plate and the negative plate in a state in which the voltage generator is applying a voltage across the positive plate and the negative plate, thereby separating oil mist from the blow-by gas by electrostatic adsorption force. At least one of the positive plate and the negative plate is made of a metal plate and includes a plurality of protrusions that are formed by cutting and raising the metal plate.

5 Claims, 4 Drawing Sheets

(51) Int. Cl.
*B01D 53/32* (2006.01)
*F01M 13/04* (2006.01)

(56) References Cited

U.S. PATENT DOCUMENTS

| | | | | |
|---|---|---|---|---|
| 5,476,539 | A * | 12/1995 | Suzuki | B03C 3/60 |
| | | | | 96/44 |
| 8,308,846 | B2 * | 11/2012 | Op de Laak | B03C 3/60 |
| | | | | 96/44 |
| 8,349,052 | B2 * | 1/2013 | Noh | B03C 3/60 |
| | | | | 96/44 |
| 9,850,860 | B2 * | 12/2017 | Takeuchi | B03C 3/60 |
| 9,903,243 | B2 * | 2/2018 | Horiuchi | B03C 3/60 |
| | | | | 96/44 |
| 10,190,456 | B2 * | 1/2019 | Takeuchi | B03C 3/155 |
| | | | | 96/67 |
| 10,933,430 | B2 * | 3/2021 | Wolf | B03C 3/08 |
| | | | | 96/88 |

* cited by examiner

ELECTROSTATIC OIL MIST SEPARATOR FOR INTERNAL COMBUSTION ENGINE

BACKGROUND

The present disclosure relates to an electrostatic oil mist separator for an internal combustion engine.

Internal combustion engines are equipped with a recirculation passage for recirculating blow-by gas in the crank chamber to the intake passage. An oil mist separator is provided in such a recirculation passage to separate oil mist from blow-by gas (for example, Japanese Laid-Open Patent Publication No. 2016-109039).

The oil mist separator disclosed in the publication includes a case having an inlet and an outlet for blow-by gas, a filter made of an electrically insulating material provided inside the case, and electrode plates sandwiching the filter. A voltage of several kV is applied across the electrode plates by a voltage generator.

In such an oil mist separator, application of voltage causes the filter to be electrically charged, and the oil mist contained in the blow-by gas passing through the filter is also electrically charged. Then, the electrically charged oil mist is adsorbed to the filter by the electrostatic force, so that the oil mist is separated from the blow-by gas.

In such an electrostatic oil mist separator, an increase in the voltage applied across the electrode plates increases the electrostatic force acting on the oil mist, thereby increasing the trapping efficiency of the oil mist. This configuration, however, increases electric power consumption.

SUMMARY

Accordingly, it is an objective of the present disclosure to provide an electrostatic oil mist separator for an internal combustion engine capable of increasing the trapping efficiency of oil mist.

To achieve the foregoing objective, an electrostatic oil mist separator for an internal combustion engine is provided. The electrostatic oil separator includes a positive plate and a negative plate facing each other, a filter comprising an electrically insulating material and arranged between the positive plate and the negative plate, a case having an inlet and an outlet and houses the positive plate, the negative plate, and the filter, and a voltage generator configured to apply a voltage across the positive plate and the negative plate. The electrostatic oil mist separator is configured to cause blow-by gas to flow from the inlet to the outlet between the positive plate and the negative plate in a state in which the voltage generator is applying a voltage across the positive plate and the negative plate, thereby separating oil mist from the blow-by gas by electrostatic adsorption force. At least one of the positive plate and the negative plate is made of a metal plate and includes a plurality of protrusions that are formed by cutting and raising the metal plate.

Other features and aspects will be apparent from the following detailed description, the drawings, and the claims.

DETAILED DESCRIPTION OF THE PREFERRED EMBODIMENTS

First Embodiment

An electrostatic oil mist separator 10 for an internal combustion engine (hereinafter, simply referred to as an oil mist separator 10) according to a first embodiment will be described with reference to FIGS. 1 to 3.

Figure 1:
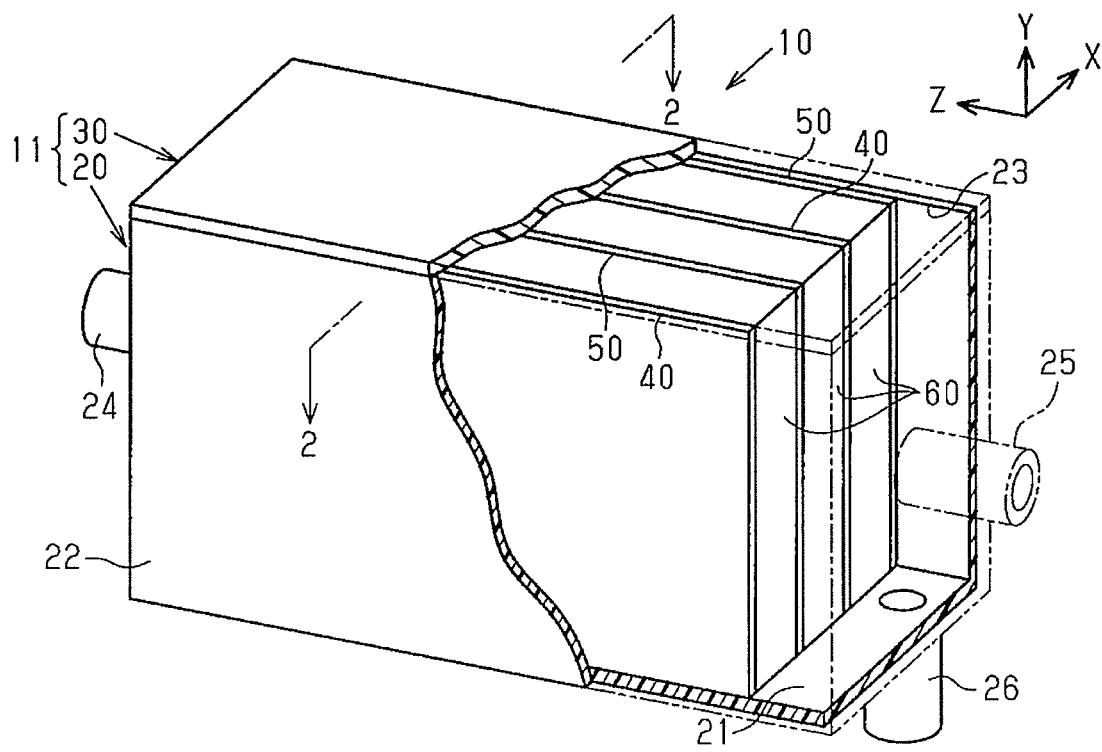
FIG. 1 is a partially cutaway perspective view of an electrostatic oil mist separator for an internal combustion engine according to a first embodiment.
Figure 2:
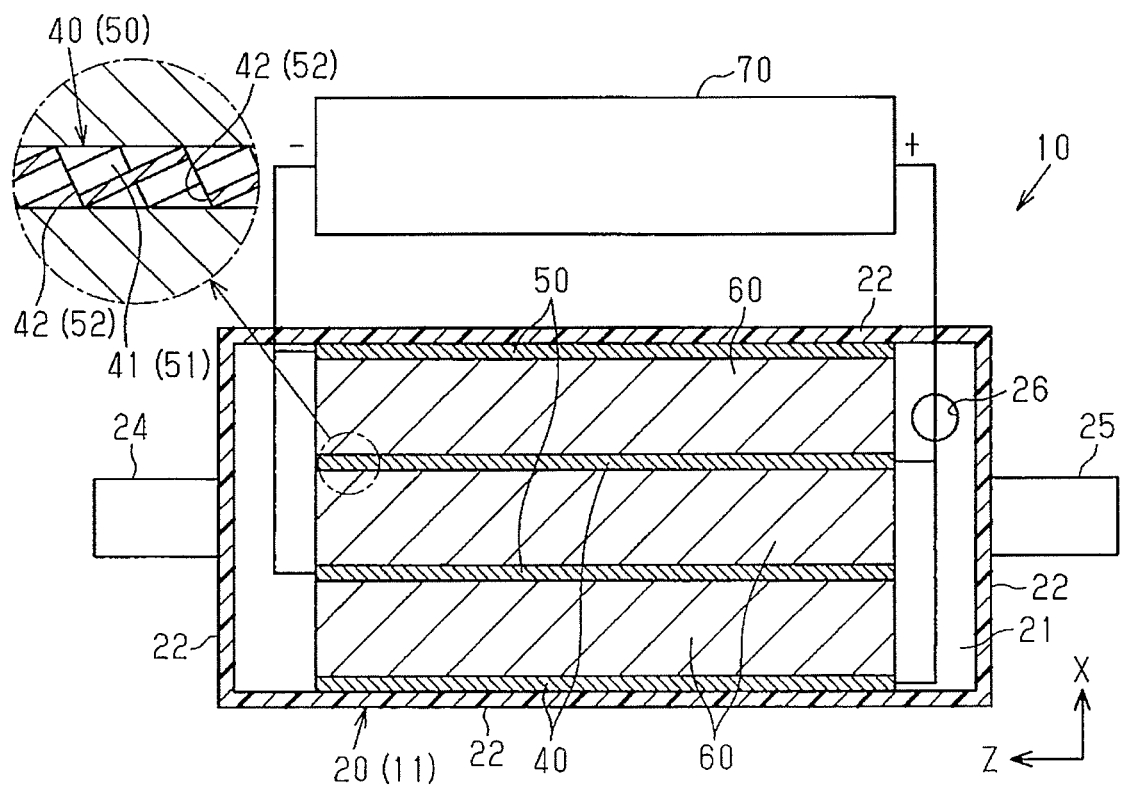
FIG. 2 is a cross-sectional view taken along line 2-2 of FIG. 1.

As shown in FIGS. 1 and 2, the oil mist separator 10 includes a case 11, two positive plates 40, two negative plates 50, and three filters 60. The case 11 has an inlet 24 and an outlet 25. The two positive plates 40 and the two negative plates 50 are housed in the case 11. Specifically, the two positive plates 40 and the two negative plates 50 are alternately arranged such that the positive plates 40 and the negative plates 50 face each other. The filters 60 are made of an electrically insulating material and each arranged between the adjacent positive plate 40 and negative plate 50. The numbers of the positive plates 40, negative plates 50, and filters 60 may be changed as appropriate.

Next, components of the oil mist separator 10 will be described.

<Case 11>

As shown in FIG. 1, the case 11 includes a case body 20 with an upper opening 23 and a rectangular plate-shaped lid body 30, which is provided at the upper part of the case body 20 to close the upper opening 23. Both the case body 20 and the lid body 30 may be made of a plastic material such as polybutylene terephthalate (PBT).

In the following description, the vertical direction in FIG. 1 is defined as a vertical direction Y, and the longitudinal direction and the width direction of the lid body 30 are defined as a longitudinal direction Z and a width direction X, respectively.

The case body 20 has four side walls 22 surrounding the rectangular upper opening 23 and a bottom wall 21 facing the upper opening 23.

A tubular inlet 24 and outlet 25 project outward at the centers of two of the four side walls 22 that face each other in the longitudinal direction Z.

An oil drain port 26 projects downward from a part of the bottom wall 21 that is close to the side wall 22 that has the outlet 25.

<Positive Plate 40>

Figure 3:
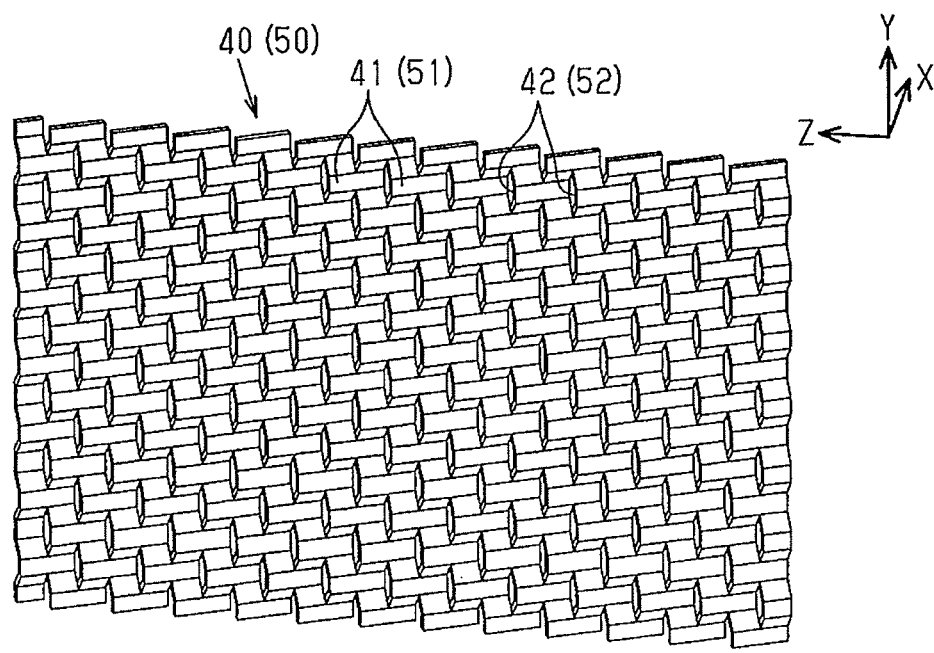
FIG. 3 is a perspective view showing a positive plate and a negative plate of the first embodiment.

As shown in FIGS. 1 to 3, the positive plates 40 each have a substantially rectangular plate shape and are arranged along the vertical direction Y and the longitudinal direction Z.

As shown in FIGS. 2 and 3, the positive plates 40 each have a metal lath-type shape made of a metal plate of, for example, a stainless steel, and have protrusions 41, which are formed by cutting and raising the metal plate. The protrusions 41 are provided over the entire positive plate 40.

The positive plates 40 are each arranged such that the cut surface 42 of each protrusion 41 is directed toward the side corresponding to the inlet 24 in the longitudinal direction Z, that is, toward the upstream side in the direction of flow of blow-by gas from the inlet 24 to the outlet 25.

As shown in FIG. 2, the positive plates 40 are connected to the positive electrode of a voltage generator 70 via conducting wires.

<Negative Plate 50>

As shown in FIGS. 1 to 3, the negative plates 50 each have a substantially rectangular plate shape and are arranged along the vertical direction Y and the longitudinal direction Z.

As shown in FIGS. 2 and 3, the negative plates 50 each have a metal lath-type shape made of a metal plate of, for example, a stainless steel, and have protrusions 51, which are formed by cutting and raising the metal plate. The protrusions 51 are provided over the entire negative plate 50.

The negative plates 50 are each arranged such that the cut surface 52 of each protrusion 51 is directed toward the side corresponding to the inlet 24 in the longitudinal direction Z, that is, toward the upstream side in the direction of flow of blow-by gas from the inlet 24 to the outlet 25.

As shown in FIG. 2, the negative plates 50 are connected to the negative electrode of the voltage generator 70 via conducting wires.

<Filter 60>

As shown in FIGS. 1 and 2, the filters 60 are made of nonwoven fabric and have a rectangular parallelepiped shape. The nonwoven fabric is made of fibers of, for example, polyethylene terephthalate (PET), which is an electrically insulating material. Electrically insulating materials such as polyethylene terephthalate are dielectric materials, in which dielectric polarization occurs.

An operation of the first embodiment will now be described.

In the oil mist separator 10, during the operation of the internal combustion engine, blow-by gas is drawn into the case 11 through the inlet 24 with a voltage of, for example, several kV applied across the positive plates 40 and the negative plates 50.

The blow-by gas flows in the case 11 from the inlet 24 to the outlet 25 along the longitudinal direction Z and is led to the outside of the case 11 through the outlet 25.

At this time, the filters 60 are electrically charged as a voltage is applied. Also, the oil mist contained in the blow-by gas flowing to the outlet 25 between the positive plates 40 and the negative plates 50 is electrically charged. Then, the electrically charged oil mist is adsorbed to the filters 60 by the electrostatic adsorption force to be separated from the blow-by gas.

In particular, a large amount of electric charge is present in the vicinity of the periphery of the positive plates 40, in the vicinity of the periphery of the negative plates 50, in the vicinity of the cut surface 42 of each protrusion 41, and in the vicinity of the cut surface 52 of each protrusion 51.

The first embodiment is capable of concentrating electric charge in the vicinity of the cut surfaces 42 and 52 of the respective protrusions 41 and 51 provided in the positive plates 40 and the negative plates 50, respectively. That is, the protrusions 41 and 51 increase the amount of areas having high electric field strength. Therefore, the electrostatic force is locally increased in the vicinity of the cut surfaces 42 and 52 of the respective protrusions 41 and 51 between the positive plates 40 and the negative plates 50, respectively, which allows the oil mist to be readily trapped.

The above-described electrostatic oil mist separator for an internal combustion engine according to the first embodiment has the following advantages.

(1) The positive plates 40 and the negative plates 50 are made of metal plates and each have protrusions 41 and 51, respectively, in which the metal plate is cut and raised.

This configuration operates in the above-described manner and increases the trapping efficiency of oil mist.

The increased trapping efficiency allows the applied voltage to be lowered, which reduces the power consumption.

Further, the positive plates 40 and negative plates 50, which have the respective protrusions 41 and 51, can be readily formed by pressing metal plates.

(2) The cut surfaces 42 and 52 of the respective protrusions 41 and 51 are directed toward the upstream side in the direction of flow of blow-by gas from the inlet 24 to the outlet 25.

With this configuration, the cut surfaces 42 and 52 of the respective protrusions 41 and 51, at which the electric field strength is increased, are positioned further upstream in the direction of flow of blow-by gas. As a result, the oil mist contained in the blow-by gas flowing between the positive plates 40 and the negative plates 50 can be adsorbed to the filters 60 at an earlier stage. This allows oil mist to be more readily trapped.

(3) The positive plates 40 and the negative plates 50 each have a metal lath-type shape having respective protrusions 41 and 51.

This configuration readily fabricates a structure in which the cut surfaces 42 and 52 of the respective protrusions 41 and 51 are directed toward the upstream side in the direction of flow of blow-by gas.

In addition, since the protrusions 41 and 51 increase the rigidity of the respective positive plates 40 and the negative plates 50, it is possible to reduce the thickness of the metal plates. Therefore, it is possible to reduce the weight of the positive plates 40 and the negative plates 50, which reduces the weight of the oil mist separator 10.

Second Embodiment

Figure 4:
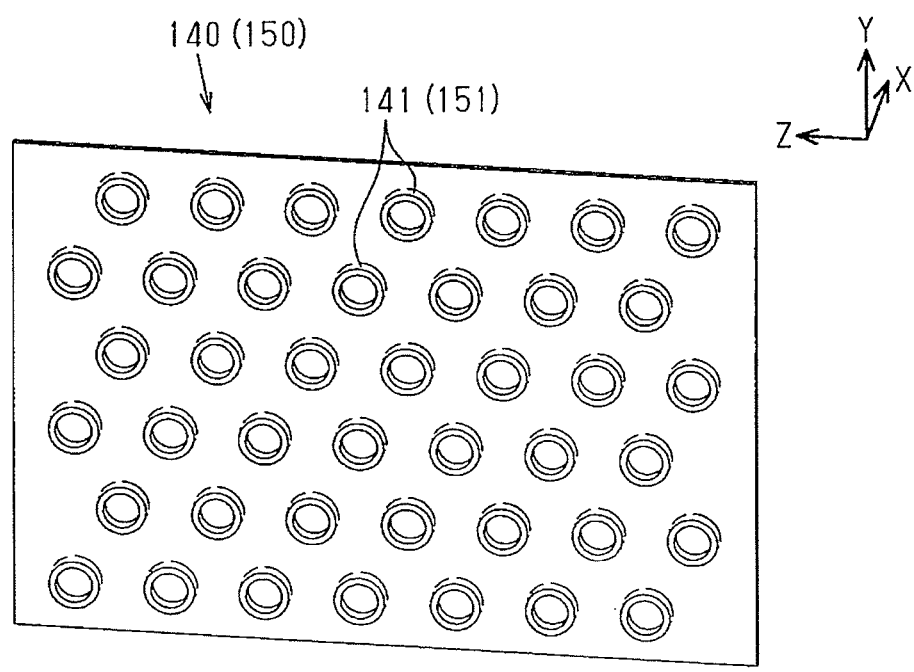
FIG. 4 is a perspective view showing a positive plate and a negative plate of a second embodiment.
Figure 5:
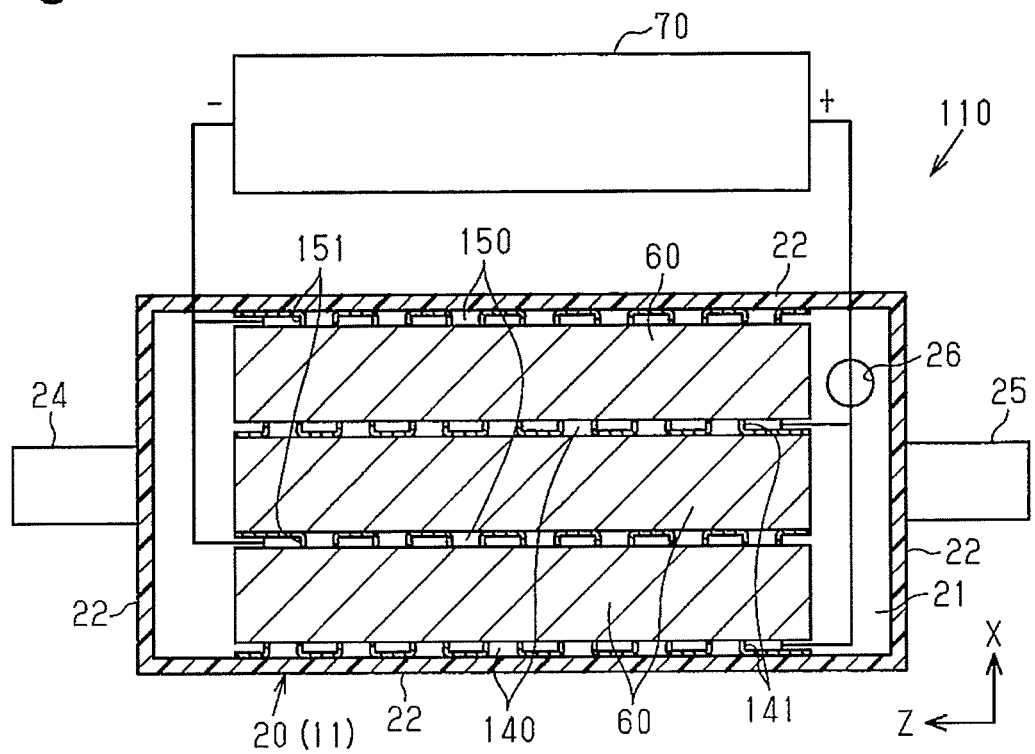
FIG. 5 is a cross-sectional view corresponding to FIG. 2, showing an electrostatic oil mist separator for an internal combustion engine according to the second embodiment.

With reference to FIGS. 4 and 5, differences between the second embodiment and the first embodiment will be mainly discussed.

In the following description, the same components as those in the first embodiment are given the same reference numerals. Also, the components that correspond to those in the first embodiment are given reference numerals obtained by adding 100 to the reference numerals of the components of the first embodiment, and redundant description will be omitted.

<Positive Plate 140>

As shown in FIGS. 4 and 5, a positive plate 140 is a punched metal plate made of a metal such as a stainless steel and has cylindrical protrusions 141, which protrude from one side of the metal plate. The protrusions 141 are provided over the entire positive plate 140.

<Negative Plate 150>

As shown in FIGS. 4 and 5, a negative plate 150 is a punched metal plate made of a metal such as a stainless steel and has cylindrical protrusions 151, which protrude from one side of the metal plate. The protrusions 151 are provided over the entire negative plate 150.

The above-described electrostatic oil mist separator for an internal combustion engine according to the second embodiment has the following advantage in addition to the advantage (1) of the first embodiment.

(4) The positive plates 140 and the negative plates 150 are each a punched metal plate having protrusions 141 and 151, respectively.

With this configuration, the positive plates 140 and negative plates 150, which have the respective protrusions 141 and 151, can be readily formed by punching metal plates.

In addition, since the protrusions 141 and 151 increase the rigidity of the positive plates 140 and the negative plates 150, respectively, it is possible to reduce the thickness of the metal plates. Therefore, it is possible to reduce the weight of the positive plates 140 and the negative plates 150, which reduces the weight of the oil mist separator 110.

MODIFICATIONS

The above-described embodiments may be modified as follows.

Figure 6:
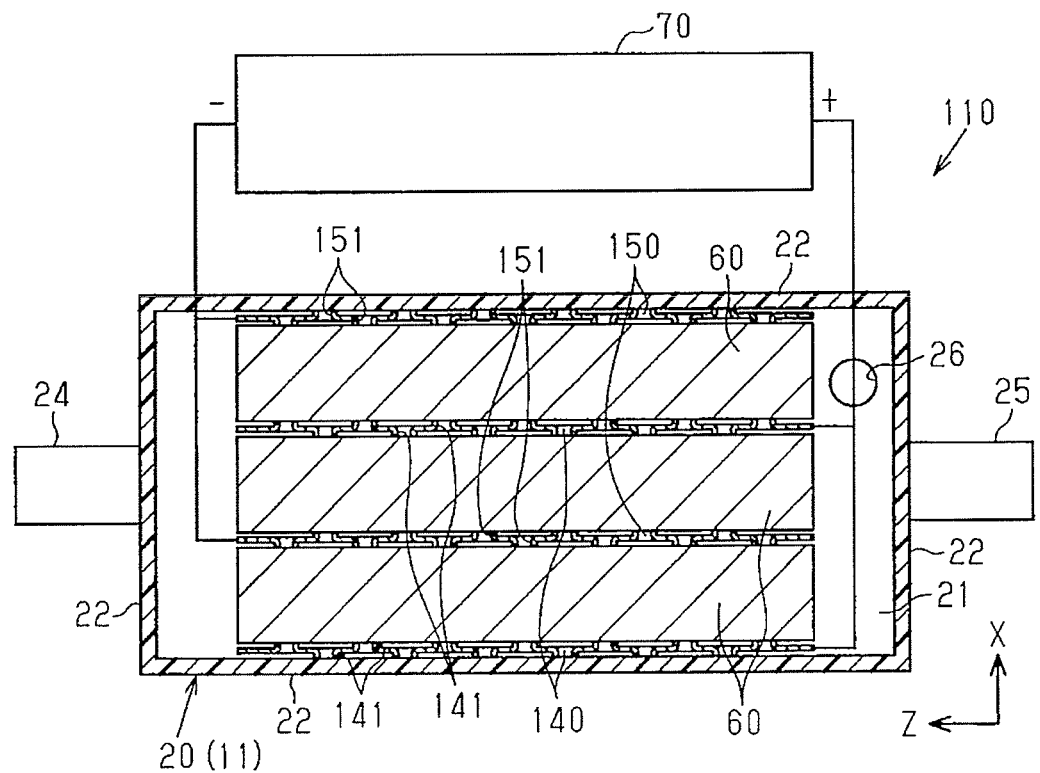
FIG. 6 is a cross-sectional view corresponding to FIG. 5, showing an electrostatic oil mist separator for an internal combustion engine according to a modification.

As shown in FIG. 6, protrusions 141 and 151 may protrude from both sides of positive plates 140 and negative plates 150, respectively. This modification has the same advantage as the advantage (4) of the second embodiment.

Figure 7A:
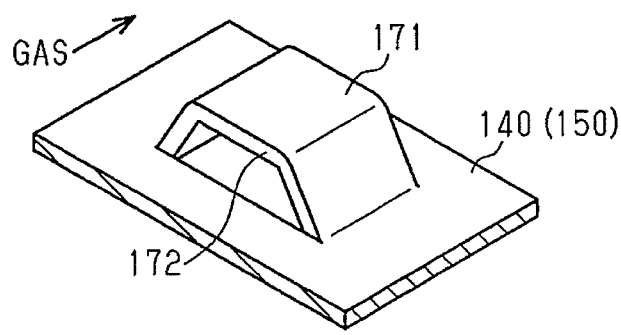
FIG. 7A is a partially enlarged perspective view of a positive plate and a negative plate, mainly showing a protrusion according to another modification.
Figure 7B:
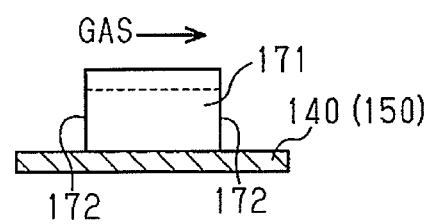
FIG. 7B is a partially enlarged side view of the positive plate and the negative plate, mainly showing the protrusion of the modification according to FIG. 7A.
Figure 8A:
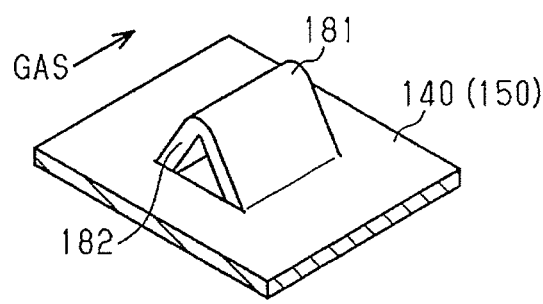
FIG. 8A is a partially enlarged perspective view of a positive plate and a negative plate, mainly showing a protrusion according to another modification.
Figure 8B:
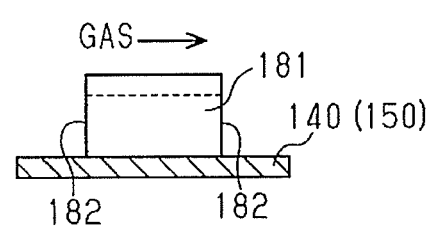
FIG. 8B is a partially enlarged side view of the positive plate and the negative plate, mainly showing the protrusion of the modification according to FIG. 8A.

As shown in FIGS. 7A and 7B, the protrusions 141 and 151 may each be replaced by a protrusion 171 that is cut and raised from a metal plate into a trapezoidal shape. Also, as shown in FIGS. 8A and 8B, the protrusions 141 and 151 may each be replaced by a protrusion 181 that is cut and raised from a metal plate into a triangular shape. Each protrusion 171 has a pair of cut surfaces 172 directed in opposite directions. Each protrusion 181 has a pair of cut surfaces 182 directed in opposite directions. In this case, the positive plates 140 and the negative plates 150 are preferably arranged such that one of each pair of the cut surfaces 172 and 182 of each protrusion 171 and 181 is respectively directed toward the upstream side in the direction of flow of blow-by gas. This modification has the same advantage as the advantage (2) of the first embodiment.

Figure 9A:
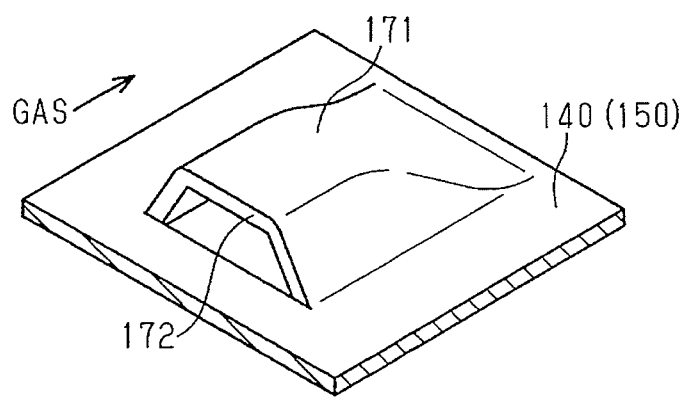
FIG. 9A is a partially enlarged perspective view of a positive plate and a negative plate, mainly showing a protrusion according to another modification.
Figure 9B:
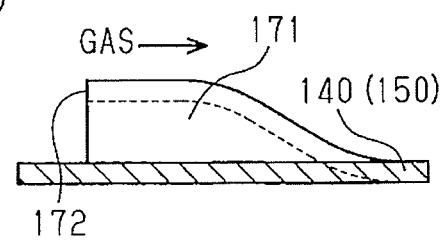
FIG. 9B is a partially enlarged side view of the positive plate and the negative plate, mainly showing the protrusion of the modification according to FIG. 9A.

As shown in FIGS. 9A and 9B, the protrusions 171 may be cut and raised from a metal plate to have one cut surface 172. In this case, the positive plates 140 and the negative plates 150 are preferably arranged such that the cut surface 172 of each protrusion 171 is directed toward the upstream side in the direction of flow of blow-by gas. This modification has the same advantage as the advantage (2) of the first embodiment.

It is also possible to arrange the positive plates and the negative plates such that the cut surfaces of the protrusions are not directed to the upstream side in the direction of flow of blow-by gas.

Only the positive plates or only the negative plates may be provided with protrusions.

The invention claimed is:

1. An electrostatic oil mist separator for an internal combustion engine, comprising:
    a positive plate and a negative plate facing each other;
    a filter comprising an electrically insulating material and arranged between the positive plate and the negative plate;
    a case having an inlet and an outlet and houses the positive plate, the negative plate, and the filter; and
    a voltage generator configured to apply a voltage across the positive plate and the negative plate, wherein
    the electrostatic oil mist separator is configured to cause blow-by gas to flow from the inlet to the outlet between the positive plate and the negative plate in a state in which the voltage generator is applying a voltage across the positive plate and the negative plate, thereby separating oil mist from the blow-by gas by electrostatic adsorption force, and
    at least one of the positive plate and the negative plate is made of a metal plate and includes a plurality of protrusions that are formed by cutting and raising the metal plate.

2. The electrostatic oil mist separator for an internal combustion engine according to claim 1, wherein both the positive plate and the negative plate each have the protrusions.

3. The electrostatic oil mist separator for an internal combustion engine according to claim 1, wherein each protrusion has a cut surface facing toward an upstream side in a direction of flow of blow-by gas from the inlet to the outlet.

4. The electrostatic oil mist separator for an internal combustion engine according to claim 1, wherein at least one of the positive plate and the negative plate has a metal lath-type shape having the protrusions.

5. The electrostatic oil mist separator for an internal combustion engine according to claim 1, wherein at least one of the positive plate and the negative plate is a punched metal plate having the protrusions.

* * * * *